United States Patent [19]

Goda

[11] 3,768,509
[45] Oct. 30, 1973

[54] LIQUID CHECK VALVE ASSEMBLY
[76] Inventor: George G. Goda, 390 1st Ave., New York, N.Y. 10010
[22] Filed: June 14, 1971
[21] Appl. No.: 152,635

[52] U.S. Cl. .................................................. 137/539
[51] Int. Cl. ............................................. F16k 15/04
[58] Field of Search ...................... 137/539; 267/158, 267/159

[56] References Cited
UNITED STATES PATENTS
3,483,888  12/1969  Wurzel ................................. 137/539
3,427,954  2/1969   Long ................................... 137/539 X
3,302,662  2/1967   Webb ................................... 137/539

FOREIGN PATENTS OR APPLICATIONS
615,750  1/1949  Great Britain ...................... 267/159
778,884  7/1957  Great Britain ...................... 137/529

Primary Examiner—William R. Cline
Attorney—Martin Novack

[57] ABSTRACT

A compact liquid check valve assembly which can handle corrosive chemicals. A valve body is provided which includes a relatively narrow tubular inlet passage which widens to form a valve seat and a relatively wide flow chamber which narrows to form a tubular outlet passage. A valve member is movably disposed within the flow chamber and has a normal rest position against the valve seat. A thin deformable biasing member mounted to extend across the flow chamber in contact with the inner walls of the flow chamber is also provided. A central portion of the biasing member contacts the valve member and biases the valve member to its normal rest position. In a preferred embodiment of the invention the biasing member is a portion of a circular disc and is formed of a polyfluorocarbon material.

8 Claims, 8 Drawing Figures

LIQUID CHECK VALVE ASSEMBLY

BACKGROUND OF THE INVENTION

This invention relates to a liquid control system and, more particularly, to a corrosion-resistant liquid check valve assembly of compact construction.

The subject matter of the present invention is related to subject matter disclosed in the copending U.S. application of G. Goda entitled Adjustable Dispensing Apparatus, Ser. No. 152,636, filed of even date herewith.

Various liquid dispensing systems which incorporate corrosion-resistant check valves have heretofore been described in the art. As an example, in the U.S. Pat. No. 3,386,470 of G. Goda and R. Coniglione there is disclosed a liquid check valve assembly which includes an elongated Teflon valve member having an enlarged mouth portion adapted to close against a valve seat. A floating disc, also of Teflon, is used in conjunction with a metal spring to apply valve closing pressure to the valve member. While this valve assembly is quite versatile, it is not fully resistant to chemicals used in a laboratory since it includes a metal spring.

Another liquid dispensing system is described in the U.S. Pat. No. 3,430,813 of R. Gilmont. In the Gilmont system a glass ball valve is held against a glass valve seat by the force of gravity. This technique, while eliminating corrodable valve parts, has the disadvantage of requiring that the valve be used in an upright position.

Accordingly, it is one of the objects of the present invention to provide a compact valve assembly which can handle corrosive chemicals and which can be used in any position.

SUMMARY OF THE INVENTION

The present invention is directed to a liquid check valve assembly which is versatile of operation and which can be constructed without metal parts. A valve body is provided which includes a relatively narrow tubular inlet passage which widens to form a valve seat, and a relatively wide flow chamber which narrows to form a tubular outlet passage. A valve member is movably disposed within the flow chamber and has a normal rest position against the valve seat. A thin deformable biasing member mounted to extend across the flow chamber in contact with the inner walls of the flow chamber is also provided. A central portion of the biasing member contacts the valve member and biases the valve member to its normal rest position.

In a preferred embodiment of the invention the valve member is ball-shaped. In this embodiment the biasing member is a portion of a circular disc and is formed of a polyfluorocarbon material.

Further features and advantages of the invention will become more readily apparent from the following detailed description when taken in conjunction with the accompanying drawings.

DESCRIPTION OF THE PREFERRED EMBODIMENT

Figure 1:
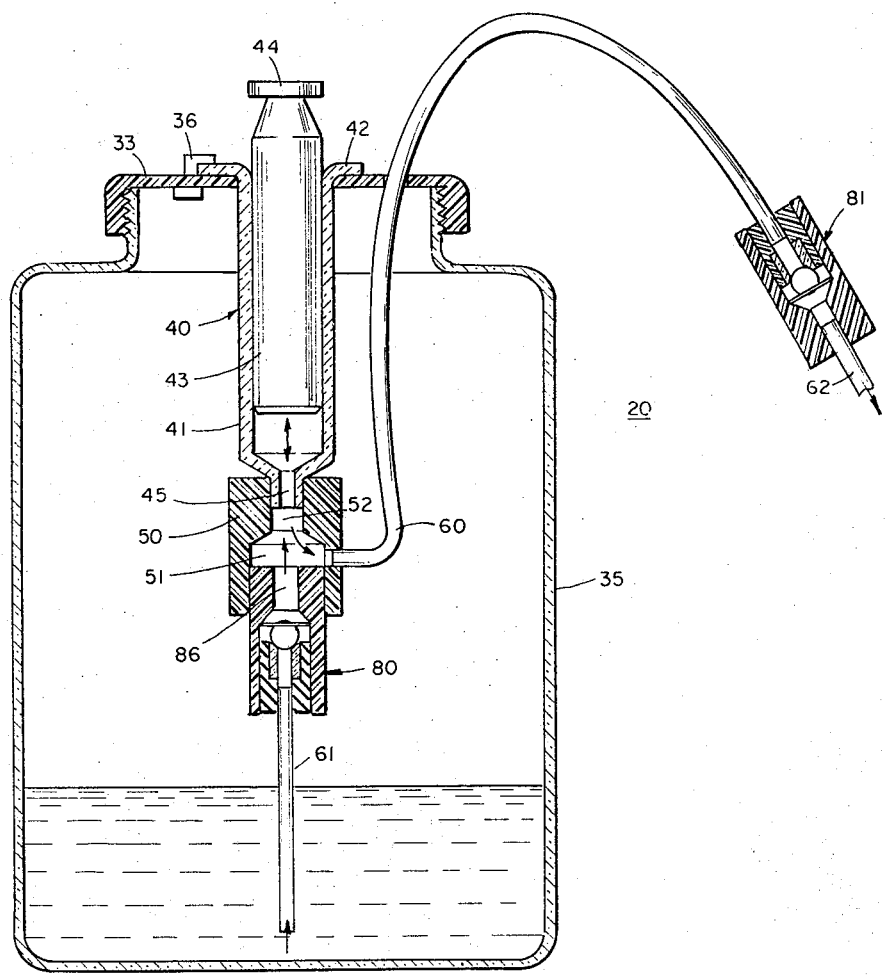
FIG. 1 is a cross-sectional perspective view of a dispensing system which incorporates the novel check valve assembly of the invention.

Referring now to FIG. 1, there is shown a dispensing system 20 incorporating the novel check valve assemblies 80 and 81 of the invention. The dispensing system 20 includes a cap portion 33 that is depicted as being screwed on a bottle 35 which holds the liquid to be dispensed. The cap 33 has a centrally located circular aperture for receiving a pumping device in the form of a syringe 40. The syringe comprises a barrel 41 which has a top annular flange 42 that rests on the cap 33 and a bottom tubular inlet/outlet tip 45. Within the barrel 41 is a piston 43 which is activated by a plunger 44. A retainer 36 is mounted in the cap to grasp the flange 42 and hold the syringe 40 firmly in place.

A connecting section 50 couples the tip 45 to both a plastic tube 60 and an outlet passage 86 of the valve 80. The section 50 has a cylindrical outer shape and is preferably constructed of an inert plastic or firm polymer such as the polyfluorocarbon Teflon. The section 50 has a narrow cylindrical mouth 52 which is fitted over and grips the tip 45, and a wider cylindrical mouth proportioned to snugly receive the outlet end of the valve assembly 80. The central inner portion of the section 50 is tapered and forms a communicating reservoir 51. A small circular aperture in the side wall of the section 50 is adapted to receive an end of the plastic tube 60 for communication with the reservoir 51. An input plastic tube 61 has one of its ends immersed in the liquid to be dispensed and its other end inserted in the inlet end of the check valve assembly 80. The plastic tube 60 is fitted through an opening in the cap 33, and is inserted in the inlet end of the check valve assembly 81. An output plastic tube 62 is inserted in the outlet end of the valve assembly 81.

Figure 2:
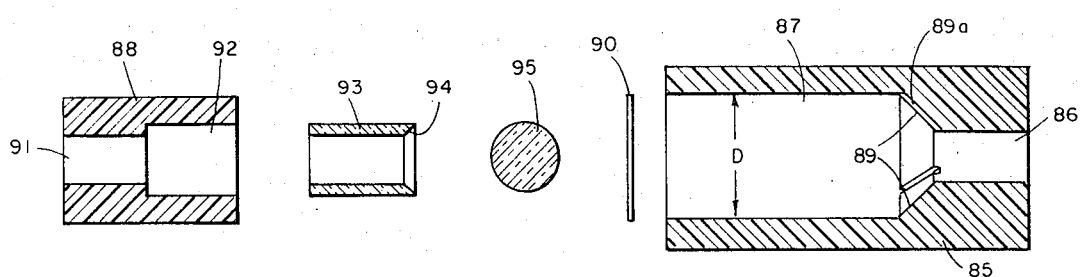
FIG. 2 is an exploded corss-section view of the check valve assembly of the invention.
Figures 3, 3A, 3B:
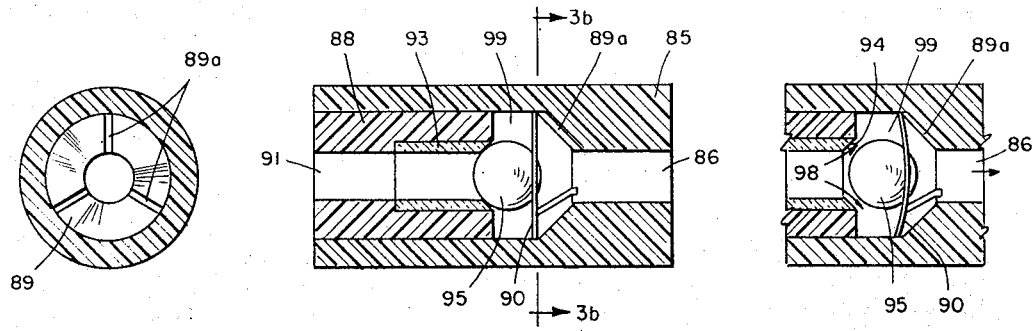
FIG. 3 is a cross-sectional view of the check valve assembly of the invention in its normal closed condition.
FIG. 3A is a cross-sectional view of the active portion of the valve assembly of the invention shown in its opened condition.
FIG. 3B is a cross-sectional view as taken across the plane B—B of the assembly of FIG. 3.

FIGS. 2 and 3 illustrate in detail the check valve assembly 80, or 81 of the invention. A main housing 85 has a cylindrical outer shape and is preferably constructed of Teflon. The housing 85 has a relatively narrow tubular mouth 86 which serves as the outlet passage of the valve assembly. A wider cylindrical mouth 87 is proportioned to receive an inner housing 88. The central portion of the main housing 85 tapers inwardly to form a frustoconical surface 89. A thin deformable biasing disc segment 90, shown in detail in FIG. 4, has a diameter D which is substantially equal to the diameter of the cylindrical mouth 87. The disc 90, which may have originally been a thin circular Teflon disc, has the side segments 96 (shown in dashed lines) removed. The disc segment 90, which also has a centrally located aperture 97, is positioned in the mouth 87 so as to rest against the widest part of the surface 89.

The inner housing 88, also preferably of Teflon, has an outer cylindrical shape proportioned to fit snugly within the mouth 87 of the outer housing 85. The inner housing 88 has a relatively narrow tubular mouth 91 which serves as the inlet passage of the valve assembly. The inner housing 88 also has a relatively wide cylindrical mouth 92 proportioned to receive the tubular piece 93 which may be formed of glass. The tubular piece 93 has an inner diameter equal to that of the mouth 91 so as to serve as a continuation of the inlet passage of the valve assembly. One end of the glass piece is ground to form a seating surface 94 which is contoured to receive and be sealed by a ball valve member 95 which also may be formed of glass.

The ball 95 and the inner housing 88 (with the tubular piece 93 positioned therein) are inserted in the main housing 85 to produce the valve assembly as illustrated in FIG. 3. In the normal closed condition of the valve assembly, the ball 95 is pushed against the valve seat 94 by the spring-like action of the biasing disc 90 and prevents liquid in the inlet passage from entering the flow chamber 99 and passing to the outlet passage 86. In operation of the valve assembly the aperture 97 in the biasing disc (FIG. 4) insures that the ball stays centrally located in the flow chamber.

The surface 89 can be provided with grooves 89a, as is shown in FIG. 3B. These shallow grooves act as a bypass under conditions of high forward pressure which could cause the disc 90 to close the entrance to the outlet passage 86. In such event liquid could still flow freely through the groves 89a. Under most operating conditions, however, the grooves are not required.

Figures 4, 5, 6:
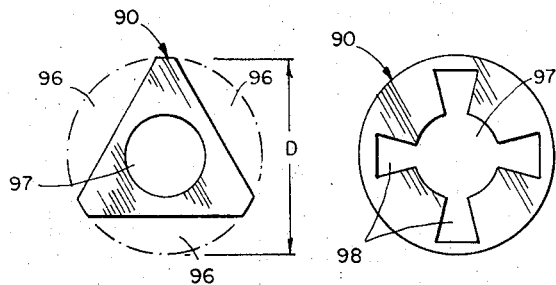
FIGS. 4, 5, and 6 are elevational views of biasing members which may be utilized in the check valve assembly of the invention.

Referring again to FIG. 1, the operation of the dispensing device 20 is initiated by lifting the plunger 44 which, in known manner, causes a pressure differential in the barrel 41. The pressure differential acts to open the valve 80 and to force liquid up through the tube 61 and the valve 80 and into the reservoir 51. A sketch of the active portion of the valve, shown in its "opened" state, appears in FIG. 3A. The pressure differential on the side of outlet passage 86 draws the ball 95 away from the valve seat 94 and allows the liquid to flow into the flow chamber 99. The liquid can then flow through the sides 96 of the disc segment 90 (FIG. 4). The disc segment 90 deforms slightly (exaggerated for illustration in FIG. 3A) as the valve opens. When the pressure differential is equalized the disc segment 90 returns to its normal shape thereby again biasing the ball 95 against the valve seat 94. It should be noted that the pressure differential which opens the valve 80 during the piston upstroke also causes the ball in the oppositely-oriented valve 81 to close more tightly against its seat.

When the plunger 44 is depressed the resultant pressure on the liquid in the reservoir 52 acts, in the manner described, to open the valve 81 and to keep the valve 80 closed. The liquid is forced through the tube 60 and the opened valve 81, and finally dispensed through the output tube 62. The advantages of utilizing a check valve at the remote end of the tube 60 are described in the copending Goda application referred to above.

While a preferred embodiment of the invention has been described, it will be appreciated that many variations can be made within the spirit of the invention. As an example, a single glass piece may replace the combination of the inner housing 88 and the tubular glass piece 93. Also, the biasing disc 90 may take on various forms. One alternate disc portion 90 having a plurality of apertures 98 which extend radially from a central aperture 97 is shown in FIG. 5. Another alternate disc portion 90, having perforations 100 to allow liquid flow, is depicted in FIG. 6. The biasing disc of FIG. 4 has been found, however, to be most preferable.

I claim:
1. A check valve assembly comprising:
    a. a valve body which includes a relatively narrow tubular inlet passage which widens to form a valve seat, and a relatively wide flow chamber which narrows to form a tubular outlet passage;
    b. a valve member movably disposed within said flow chamber and having a normal rest position against said valve seat; and
    c. a thin normally flat deformable biasing member, formed exclusively of polyflurocarbon material mounted to extend across said flow chamber with the outer extremities of said biasing member contacting the narrowing portion of said flow chamber such that movement of said biasing member extremities toward said outlet passage is resisted, a central portion of said biasing member contacting said valve member so that motion of siad valve member toward said outlet passage deforms said biasing member whereby said valve member is biased toward its normal rest position.
2. The check valve assembly as defined by claim 1 wherein said biasing member is a portion of a circular disc.
3. The check valve assembly as defined by claim 1 wherein said valve member is ball-shaped.
4. The check valve assembly as defined by claim 3 wherein said biasing member has a centrally located aperture to receive said ball-shaped valve member.
5. The check valve assembly as defined by claim 1 wherein the narrowing portion of said flow chamber includes at least one groove extending in the direction of said outlet passage.
6. The check valve assembly as defined by claim 1 wherein the narrowing portion of said flow chamber forms a frustoconical surface.
7. The check valve assembly as defined by claim 6 wherein said biasing member is a segment of a circular disc.
8. The check valve assembly as defined by claim 7 wherein said valve member is ball-shaped.

* * * * *